United States Patent
Benisty et al.

(10) Patent No.: US 12,321,633 B2
(45) Date of Patent: Jun. 3, 2025

(54) DRAM-LESS SSD WITH COMMAND DRAINING

(71) Applicant: Western Digital Technologies, Inc., San Jose, CA (US)

(72) Inventors: Shay Benisty, Beer Sheva (IL); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/516,219

(22) Filed: Nov. 21, 2023

(65) Prior Publication Data

US 2024/0086105 A1   Mar. 14, 2024

Related U.S. Application Data

(60) Division of application No. 17/714,861, filed on Apr. 6, 2022, now Pat. No. 11,861,217, which is a
(Continued)

(51) Int. Cl.
*G06F 3/06* (2006.01)

(52) U.S. Cl.
CPC .......... *G06F 3/0656* (2013.01); *G06F 3/0604* (2013.01); *G06F 3/0659* (2013.01); *G06F 3/0679* (2013.01)

(58) Field of Classification Search
CPC .... G06F 3/0659; G06F 3/0604; G06F 3/0656; G06F 3/0673
See application file for complete search history.

(56) References Cited

U.S. PATENT DOCUMENTS

| | | | |
|---|---|---|---|
| 4,603,382 A | 7/1986 | Cole et al. | |
| 6,694,390 B1 * | 2/2004 | Bogin | G06F 13/24 710/200 |

(Continued)

FOREIGN PATENT DOCUMENTS

| | | |
|---|---|---|
| CN | 104657145 A | 5/2015 |
| CN | 109992201 A | 7/2019 |

(Continued)

OTHER PUBLICATIONS

NVM Express Base Specification, Revision 1.4; retrieved from https://nvmexpress.org/wp-content/uploads/NVM-Express-1_4-2019.06.10-Ratified.pdf on Jul. 28, 2022; Published Jun. 10, 2019; (Year: 2019).

(Continued)

*Primary Examiner* — Prasith Thammavong
(74) *Attorney, Agent, or Firm* — PATTERSON + SHERIDAN, LLP

(57) ABSTRACT

A data storage device includes one or more memory device and a controller that is DRAM-less coupled to the one or more memory devices. The controller is configured to receive a command from a host device, begin execution of the command, and receive an abort request command for the command. The command includes pointers that direct the data storage device to various locations on the data storage device where relevant content is located. Once the abort command is received, the content of the host pointers stored in the data storage device RAM are changed to point to the HMB. The data storage device then waits until any already started transactions over the interface bus that are associated with the command have been completed. Thereafter, a failure completion command is posted to the host device.

10 Claims, 8 Drawing Sheets

Related U.S. Application Data continuation-in-part of application No. 17/184,527, filed on Feb. 24, 2021, now Pat. No. 11,500,589.

(60) Provisional application No. 63/087,737, filed on Oct. 5, 2020.

(56) References Cited

U.S. PATENT DOCUMENTS

| | | |
|---|---|---|
| 7,752,340 B1 | 7/2010 | Porat et al. |
| 9,996,262 B1 | 6/2018 | Nemawarkar et al. |
| 10,282,250 B1* | 5/2019 | Banerjee ............... G06F 3/0659 |
| 10,372,378 B1 | 8/2019 | Benisty et al. |
| 10,642,536 B2 | 5/2020 | Chaturvedi et al. |
| 2002/0035675 A1* | 3/2002 | Freerksen ........... G06F 12/0831 |
| | | 711/146 |
| 2013/0179614 A1 | 7/2013 | Ross et al. |
| 2016/0266906 A1 | 9/2016 | Zou et al. |
| 2017/0242606 A1 | 8/2017 | Vlaiko et al. |
| 2017/0315889 A1* | 11/2017 | Delaney .............. G06F 11/1441 |
| 2018/0018101 A1 | 1/2018 | Benisty et al. |
| 2019/0138220 A1 | 5/2019 | Hahn et al. |
| 2019/0250850 A1 | 8/2019 | Benisty et al. |
| 2020/0151055 A1* | 5/2020 | Eom ........................ G06F 13/28 |
| 2022/0113901 A1* | 4/2022 | Turner .................. G06F 3/0673 |
| 2022/0229586 A1 | 7/2022 | Benisty et al. |

FOREIGN PATENT DOCUMENTS

| | | |
|---|---|---|
| CN | 111149096 A | 5/2020 |
| CN | 111164566 A | 5/2020 |
| CN | 1111333416 A | 5/2020 |

OTHER PUBLICATIONS

Yangyang, Z, et al., "A Design and implementation of memory expansion chip based on standard DDR bus", High Technology Newsletter, Issue 03, pp. 13, Mar. 15, 2020.

Jia, H., et al., "A Brief Discussion on the NVMe Storage Protocol", China Academic Journal Electronic Publishing House, Issue 03, Mar. 20, 2020.

\* cited by examiner

DRAM-LESS SSD WITH COMMAND DRAINING

CROSS-REFERENCE TO RELATED APPLICATIONS

This application is a divisional of co-pending U.S. patent application Ser. No. 17/714,861, filed Apr. 6, 2022, which application is a continuation-in-part of U.S. patent application Ser. No. 17/184,527, filed Feb. 24, 2021, which claims benefit of U.S. Provisional Patent Application Ser. No. 63/087,737, filed Oct. 5, 2020. Each of the aforementioned related patent applications is herein incorporated by reference.

BACKGROUND OF THE DISCLOSURE

Field of the Disclosure

Embodiments of the present disclosure generally relate to aborting a command efficiently using the host memory buffer (HMB).

Description of the Related Art

In a storage system, a pending command sometimes is aborted either by the host device or by the data storage device. There are several scenarios when a command should be aborted. One scenario is where the host device issues an abort command whereby the host device specifies the ID of the command that should be aborted and the data storage device should act accordingly. A second scenario is where the host device deletes a queue command that the host device had previously issued. The host device may delete the submission or completion queue and the data storage device should then abort all associated commands before deleting the queue.

A third scenario is a command timeout where the data storage device may need to terminate the command. The termination may be due to recovery from NAND failure which involves a recovery mechanism that rebuilds data based on parity information, but the reconstruction takes a long time. The termination may also be due to maintenance starvation, which can occur due to extreme fragmentation of the physical space. Fragmentation reduces throughput which can lead to command timeouts if the commands and maintenance operations are interleaved. Interleaving of commands and maintenance generally occurs during aggressive power management where no maintenance time is permitted or during intensive high queue depth random write workloads. The termination may also be due to a very high queue depth where outstanding commands can timeout before the data storage device retrieves the commands if a command within a device is stalled due to reasons mentioned above.

A fourth scenario is advanced command retry where the data storage device decides to fail the command while asking the host device to re-queue the command at a later time. Generally, aborting a command is not a simple flow. The challenge is when the command has already started the execution phase. Before aborting the command, the data storage device must first terminate all tasks associated with the command and only then issue a completion message to the host device. After issuing the completion message, the data storage device must not access the relevant host memory buffers (HMBs).

Previously, before aborting a command, the data storage device first terminates all tasks associated with the command by scanning the pending activities and only then issuing the completion message to the host device. Alternatively, before aborting the command, the data storage device first waits until already started tasks are completed and only then will issue the completion message to the host device.

Therefore, there is a need in the art for processing abort commands more efficiently.

SUMMARY OF THE DISCLOSURE

The present disclosure generally relates to aborting a command efficiently using the host memory buffer (HMB). A data storage device includes one or more memory device and a controller that is DRAM-less coupled to the one or more memory devices. The controller is configured to receive a command from a host device, begin execution of the command, and receive an abort request command for the command. The command includes pointers that direct the data storage device to various locations on the data storage device where relevant content is located. Once the abort command is received, the content of the host pointers stored in the data storage device RAM are changed to point to the HMB. The data storage device then waits until any already started transactions over the interface bus that are associated with the command have been completed. Thereafter, a failure completion command is posted to the host device.

In one embodiment, a data storage device comprises: one or more memory devices; and a controller coupled to the one or more memory devices, wherein the data storage device is DRAM-less, and wherein the controller is configured to: receive an original command from a host device; begin execution of the original command; receive an abort request command to abort an original command, wherein the abort request command is either received from a host device or generated by the data storage device; modify one or more pointers of the original command that reside in a host memory buffer (HMB); drain a set of data associated with the original command to the HMB; and return a failure completion message to the host device, wherein the failure completion message is returned to the host device after already issued data transfers using original command pointers are completed.

In another embodiment, a data storage device comprises: one or more memory devices; and a controller coupled to the one or more memory devices, wherein the data storage device is DRAM-less, and wherein the controller is configured to: receive an original command from a host device; determine to complete original command with Advanced Command Retry (ACR); allocate one or more host memory buffers (HMBs) for holding a set of data associated with the original command; return a completion message to the host device, wherein the completion message requests the host device to re-try the original command; execute the original command while transferring data to the allocated one or more buffers within HMBs; receive a reissued original command from the host device; and copy data for the reissued original command from the allocated one or more buffers within HMBs.

In another embodiment, a data storage device comprises: one or more memory means; and a controller coupled to the one or more memory means, wherein the host device is DRAM-less, and wherein the controller is configured to: receive an abort command request from a host device; allocate a first host memory buffer (HMB) and a second HMB for holding a series of data associated with the abort command request, wherein: the first HMB is configured to drain the series of data associated with the abort command request; and the second HMB is configured to point to a drain buffer; and return a completion message to the host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to aborting a command efficiently using the host memory buffer (HMB). A data storage device includes one or more memory device and a controller that is DRAM-less coupled to the one or more memory devices. The controller is configured to receive a command from a host device, begin execution of the command, and receive an abort request command for the command. The command includes pointers that direct the data storage device to various locations on the data storage device where relevant content is located. Once the abort command is received, the content of the host pointers stored in the data storage device RAM are changed to point to the HMB. The data storage device then waits until any already started transactions over the interface bus that are associated with the command have been completed. Thereafter, a failure completion command is posted to the host device.

Figure 1A:
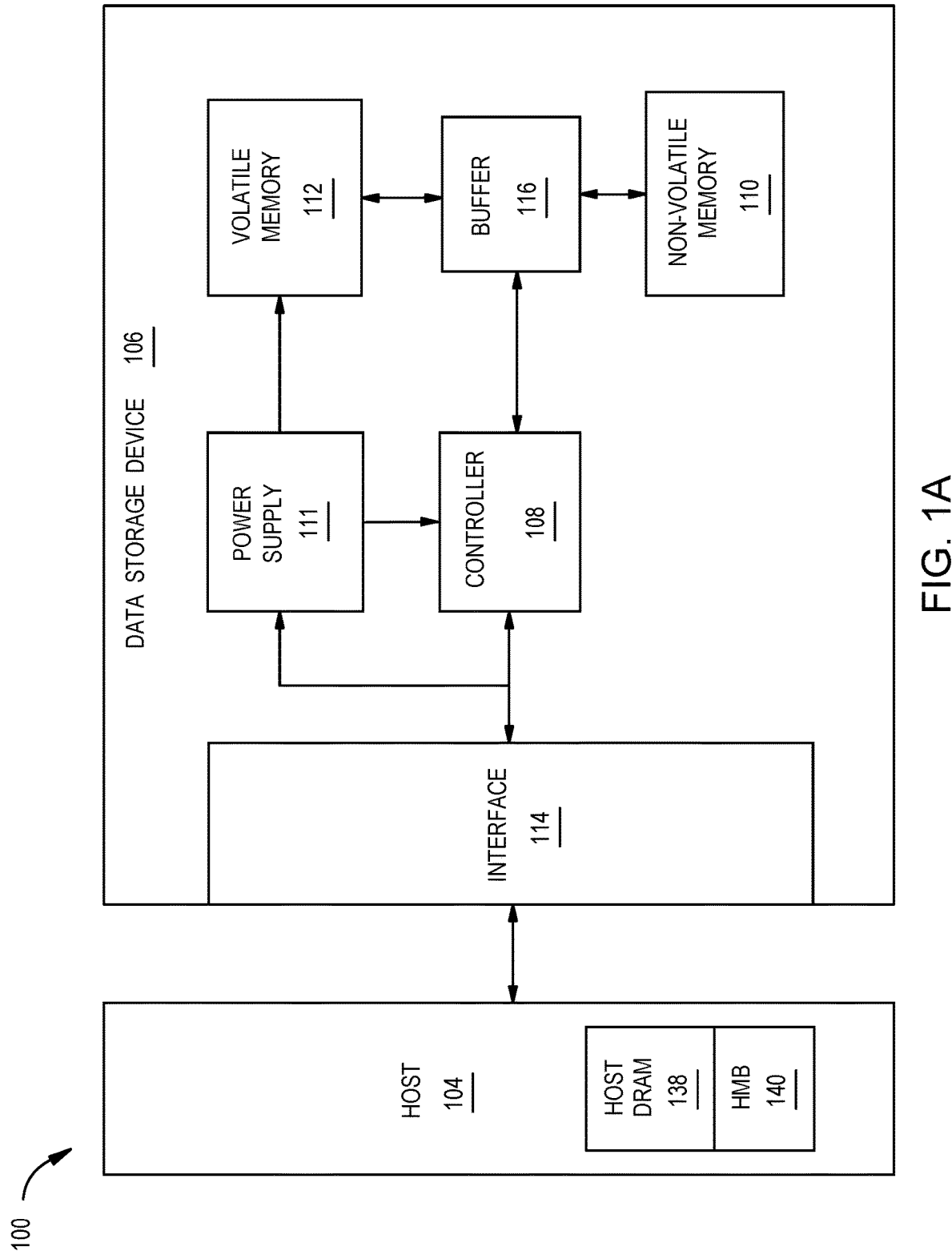
FIGS. 1A and 1B are schematic block diagrams illustrating a storage system in which data storage device may function as a storage device for a host device, according to certain embodiments.

FIG. 1A is a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138, where a portion of the host DRAM 138 is allocated as a host memory buffer (HMB) 140. The HMB 140 may be used by the data storage device 106 as an additional working area or an additional storage area by the data storage device 106. The HMB 140 may be inaccessible by the host device in some examples. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1A, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1A for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1A, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1A, volatile memory 112 may consume power received from the power supply 111. Examples of volatile memory 112 include, but are not limited to, random-access memory (RAM) static RAM (SRAM), flip-flops, and latches.

The data storage device 106 includes a controller 108, which may include the volatile memory 112. For example, the controller 108 may include SRAM. Furthermore, the controller 108 may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110. In some other embodiments, the HMB 140 may be utilized.

Figure 1B:
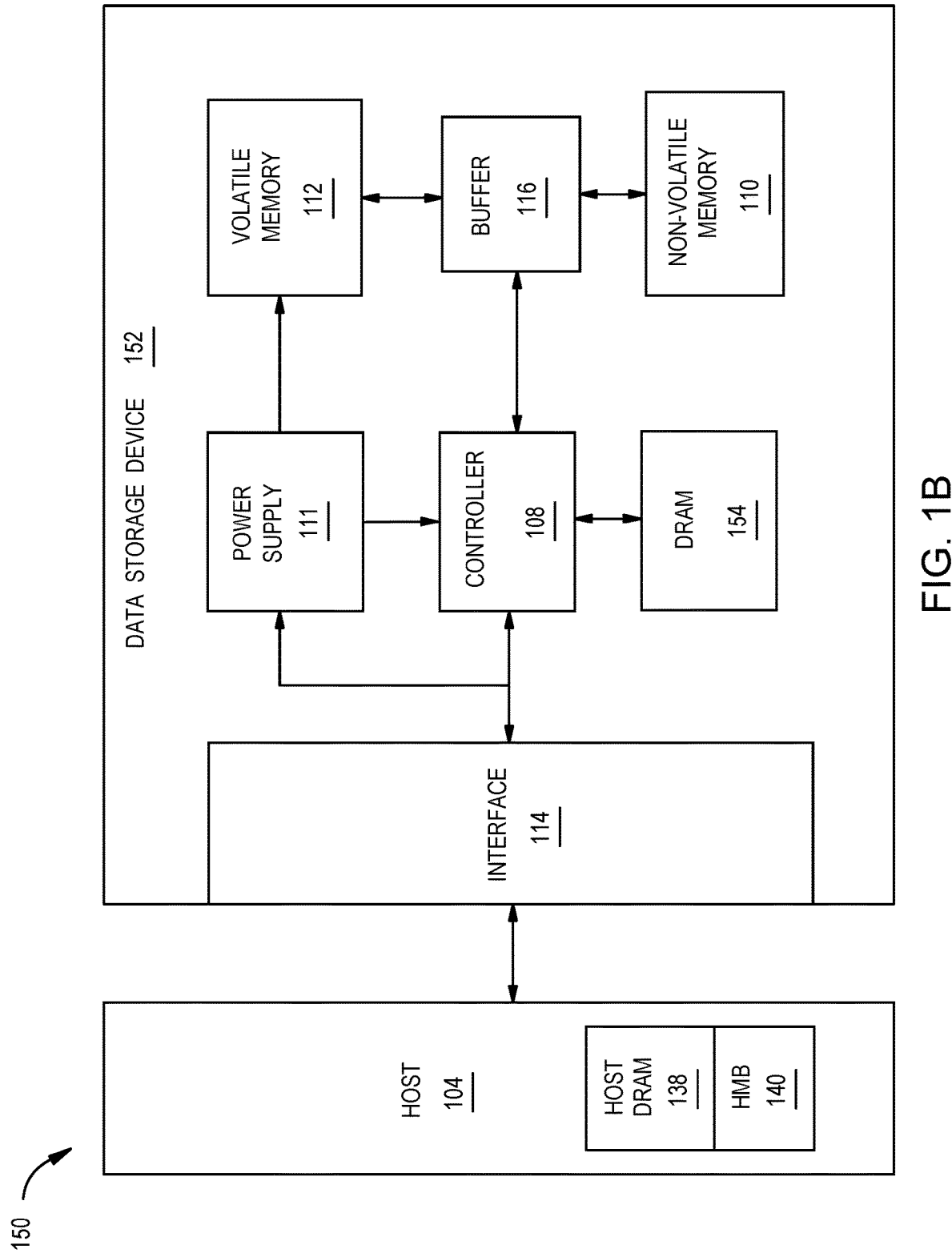

FIG. 1B is a schematic block diagram illustrating a storage system 150 in which data storage device 106 may function as a storage device for a host device 104, according to certain embodiments. For simplification purposes, common elements between the storage system 100 of FIG. 1A and the storage system 150 may be referenced by the same reference numeral. The storage system 150 is similar to the storage system shown in FIG. 1A. However, in the storage system 150, the data storage device 152 includes dynamic RAM (DRAM) 154, whereas in the storage system 100, the data storage device 106 is DRAM-less. In embodiments described herein, where the DRAM 154 is present, such as in the storage system 150, data and pointers corresponding to one or more commands may be temporarily stored in the DRAM 154 prior to being processed. However, in embodiments described herein, where the DRAM 154 is not present, such as in the storage system 100 where the data storage device 106 is DRAM-less, data and pointers corresponding to one or more commands may be temporarily stored in the HMB 140 or in other volatile memory, such as SRAM. Furthermore, examples of volatile memory 112 may further include, but not limited to, DRAM and synchronous dynamic RAM (SDRAM (e.g., DDR1, DDR2, DDR3, DDR3L, LPDDR3, DDR4, LPDDR4, and the like)).

Figure 2:
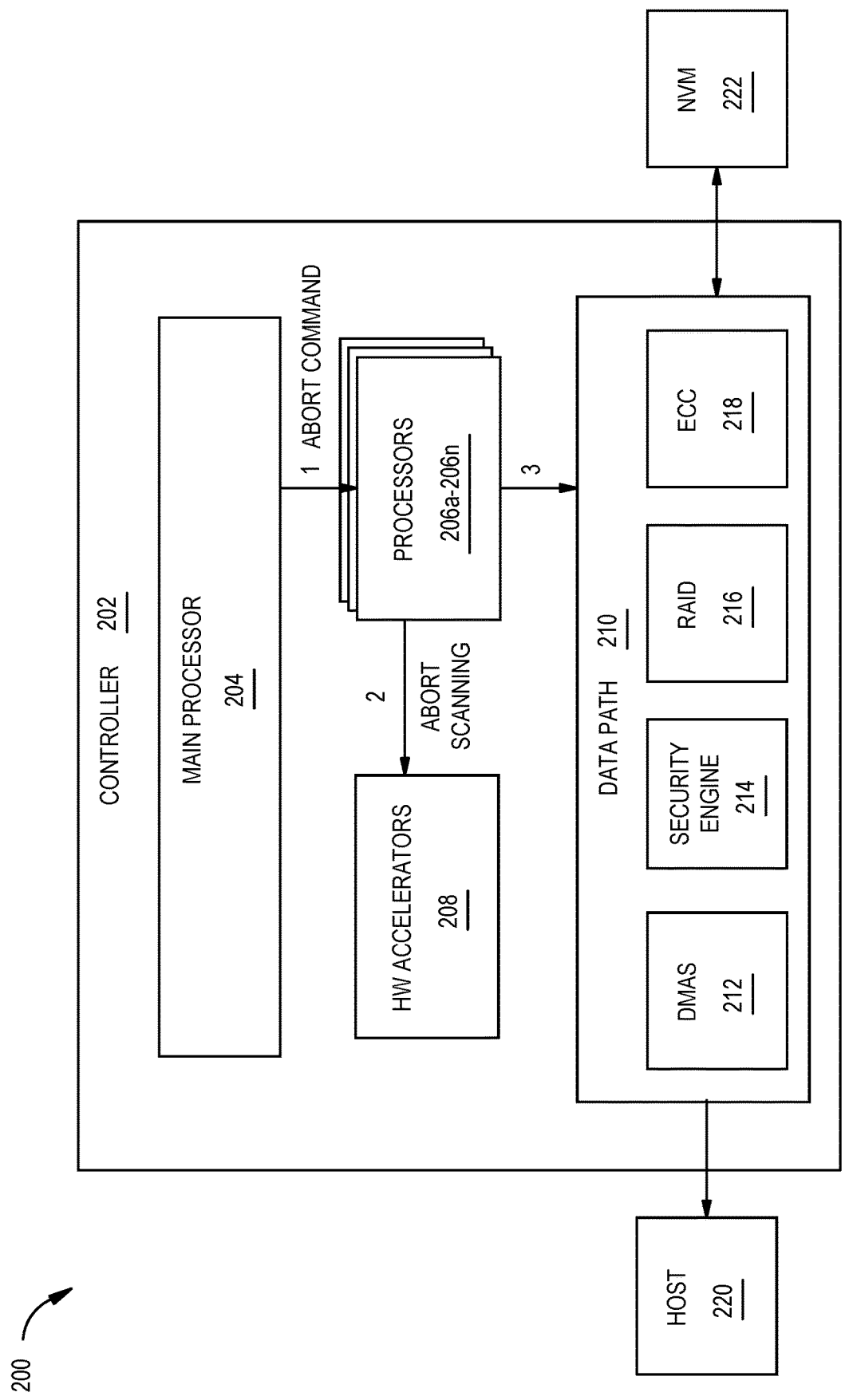
FIG. 2 is a schematic illustration of an abort request, according to certain embodiments.

FIG. 2 is a schematic illustration of an abort request, according to certain embodiments. Aspects of FIG. 2 may be similar to the storage system 100 of FIG. 1A. For example, host 220 may be the host device 104, controller 202 may be the controller 108, and NVM 222 may be the NVM 110. During data storage device, such as the data storage device 106 of FIG. 1A operation, a pending command, such as host generated read command or a host generated write command, may be aborted by either the host 220 or by the controller 202. An abort command may be issued by the host 220 or by the controller 202. For example, the abort command may be generated by a main processor 204 of the controller 202, where the main processor 204 sends the abort command to one or more processors 206a-206n of the controller 202.

When abort command is received by the one or more processors 206a-206n, the one or more processors may either terminate all tasks associated with the abort command by scanning the pending commands or wait to terminate all pending commands not yet started, where the pending commands that are started are allowed to complete prior to terminating all other pending commands. After terminating the relevant pending commands, a completion message is issued to the host 220.

Regarding FIG. 2, the main processor 204 issues an abort command request to the one or more processors 206a-206n. The one or more processors 206a-206n utilizes the hardware (HW) accelerators 208 to scan each pending command and terminate the relevant pending commands. After terminating the relevant pending commands, the one or more processors 206a-206n posts a completion message, which may be a failure completion message if the abort command initiated by the data storage device, to the data path 210, where the data path 210 transmits the completion message to the host 220.

In regular operation, the data path 210 may be utilized to transfer data to and from the NVM 222 by utilizing the direct memory access (DMA) modules 212, encode/decode error correction code (ECC) using an ECC engine 218, generate security protocols by the security engine 214, and manage the storage of the data by the RAID module 216. The abort command operation may have a high latency before posting the completion message or the failure completion message to the host 220. Because of the high latency, buffer and the resources of the data storage device may be utilized inefficiently. Furthermore, certain cases of abort command operations may have to be performed separately or have a separate procedure to complete the certain cases of abort command operations.

Figure 3:
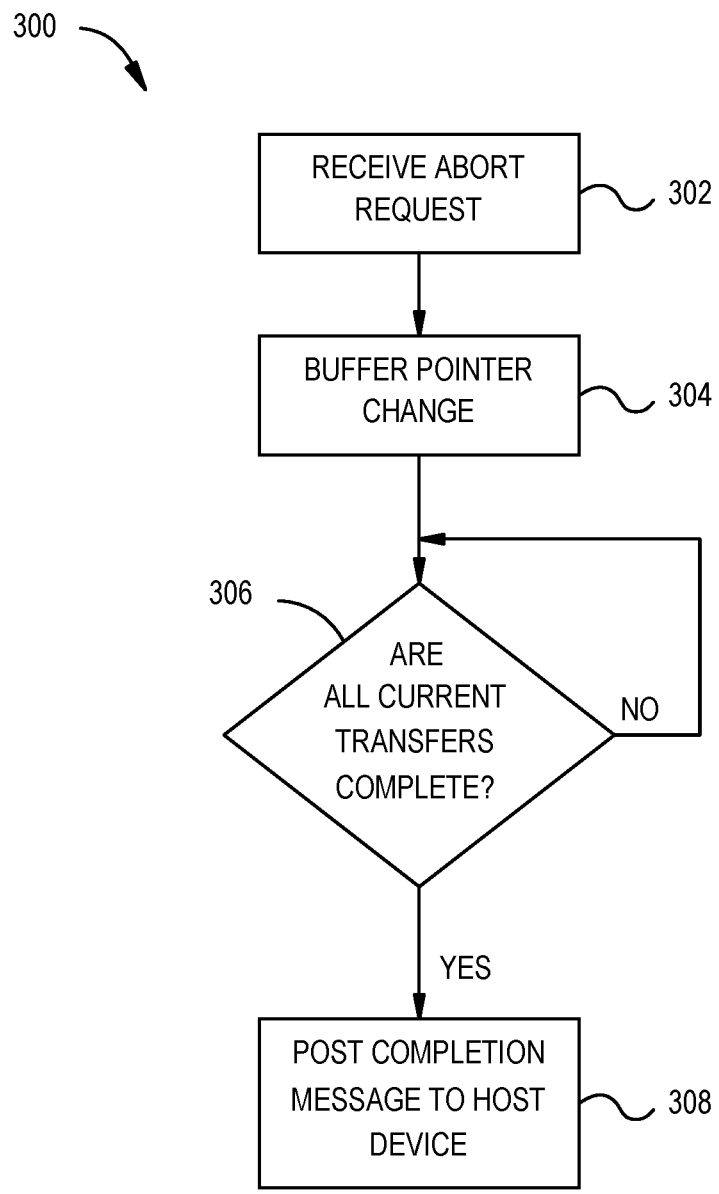
FIG. 3 is a flowchart illustrating an abort request process, according to certain embodiments.

FIG. 3 is a flowchart illustrating an abort request process 300, according to certain embodiments. At block 302, an abort request or an abort command is received by the one or more processors, such as the one or more processors 206a-206n of FIG. 2, where the one or more processors may be a component of the controller, such as the controller 202 of FIG. 2. In some embodiments, the abort request may be generated by the host, such as the host 220, and transferred to the controller via a data bus. In other embodiments, the abort request may be generated by the main processor, such as the main processor 204 of FIG. 2, where the main processor sends the abort request to the relevant processor of the one or more processors.

At block 304, the controller modifies the content of the buffer pointers that reside in an internal copy of the command. In embodiments where the data storage device includes a DRAM, such as the data storage device 152 including the DRAM 154 of FIG. 1B, the internal copy of the command may be the command stored in the DRAM 154 of the data storage device 152. However, in embodiments where the data storage device is DRAM-less, such as the data storage device 106 of FIG. 1A, the internal copy of the command may be stored in an HMB, such as the HMB 140 of FIG. 1A, or in an internal cache, such as the SRAM of the controller 108. The buffer pointers may be pointing to the HMB, such as the HMB 140 of FIG. 1A. In some embodiments, the HMB includes two 4 KB HMB buffers. The previously listed values are not intended to be limiting, but to provide an example of a possible embodiment. At block 306, the controller determines if all the current transfers are complete. The current transfers may be commands executed, but not yet completed. If the current transfers are not yet complete, then the controller waits for the current transfers to be completed. However, if the current transfers are completed at block 306, then at block 308, the controller posts a completion message or a failure completion message to the host device.

Figure 4:
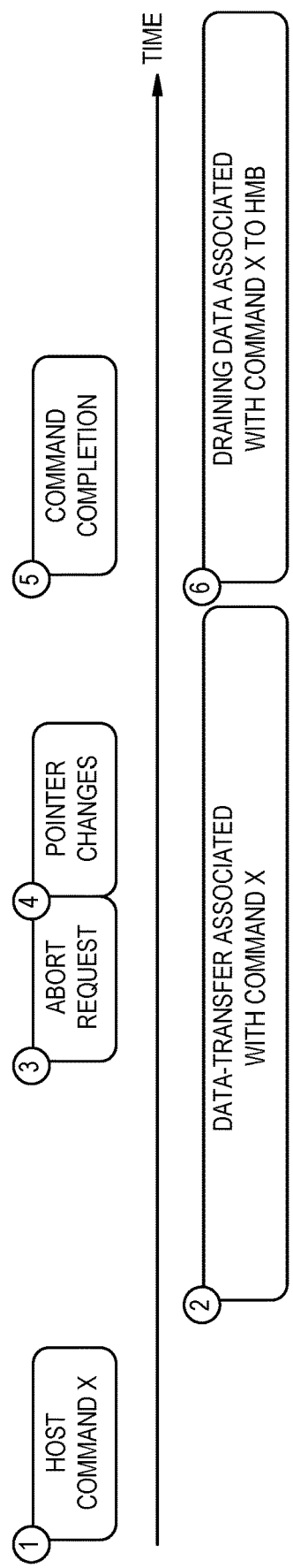
FIG. 4 is a timing diagram of processing an abort request, according to certain embodiments.

FIG. 4 is a timing diagram of processing an abort request, according to certain embodiments. Aspects of FIG. 4 may be similar to those described in FIG. 3. At time 1, the host device, such as the host device 104 of FIG. 1A, issues a command to the data storage device, such as the data storage device 106 of FIG. 1A. The command may either be a read command, a write command, or the like. At some time after the host issues the command to the data storage device, due to transfer latencies and the like, such as time 2, the controller, such as the controller 202 of FIG. 2, initiates the data transfer operation.

While the data transfer operation is executed, the data storage device receives an abort command at time 3. In one embodiment, the abort command may be generated by the host device. In another embodiment, the abort command may be generated by the data storage device, where the abort command is generated by the controller or the main processor, such as the main processor 204 of FIG. 2. At time 4, the data storage device modifies the one or more pointers associated with the abort command that resides in the data storage device. In embodiments where the data storage device includes a DRAM, such as the data storage device 152 of FIG. 1B, the one or more pointers may be stored in the DRAM 154 and the controller 108 may modify the one or more pointers associated with the abort command stored in the DRAM 154. However, in embodiments where the data storage device does not include the DRAM 154, such as the data storage device 106 of FIG. 1A, the one or more pointers may be temporarily stored in SRAM or stored in HMB and modified in either SRAM or the HMB.

At time 5, the data storage device sends a failure completion message to the host device, which occurs after the data transfer operation at time 2. At time 6, the data transfer operation has stopped and the data storage device drains a set of data associated with the abort request command to the HMB, such as the HMB 140 of FIG. 1A. In some embodiments, the draining of the set of data begins prior to posting the failure completion message to the host. In other embodiments, the failure completion message is posted before the data transfer to HMB operation is aborted. In embodiments where the data storage device includes a DRAM, such as the data storage device 152 of FIG. 1B, the set of data may be drained to the DRAM, such as the DRAM 154 of FIG. 1B.

Figure 5:
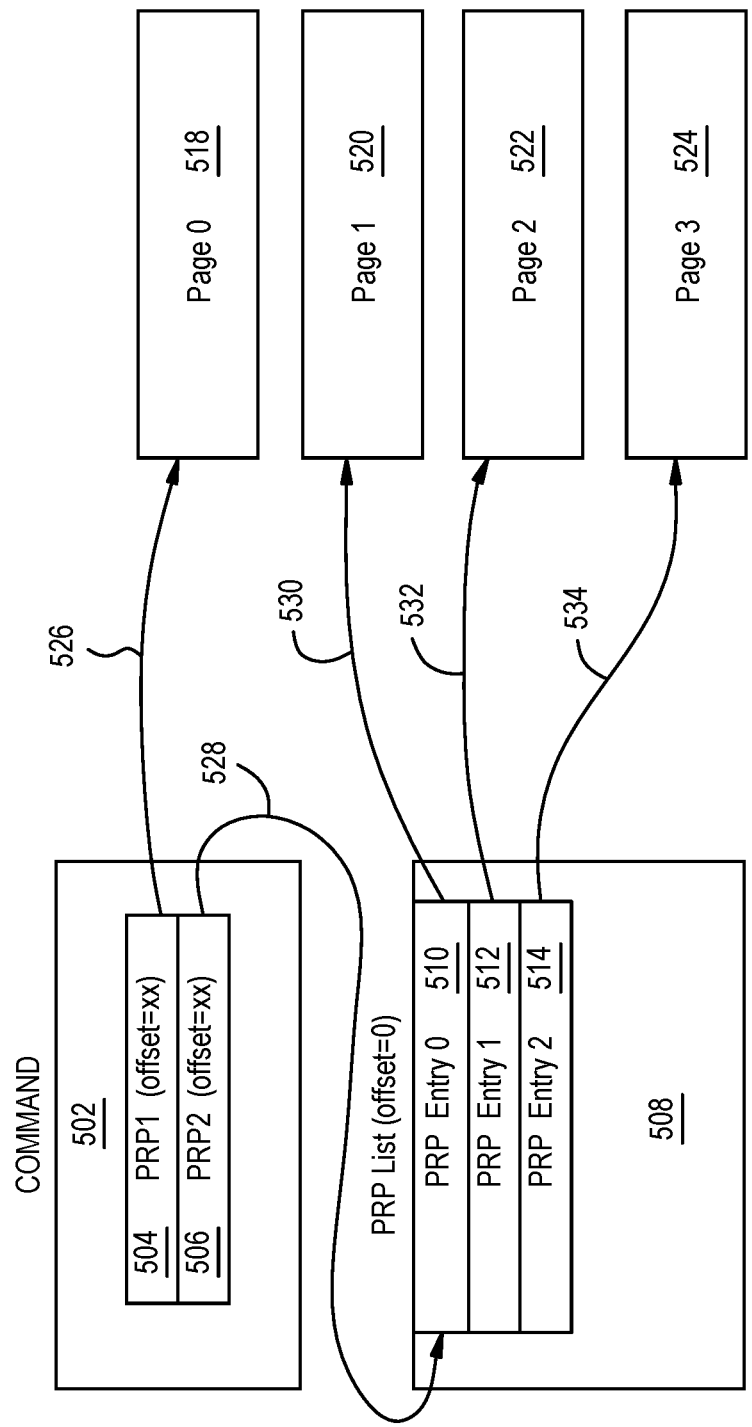
FIG. 5 is a schematic illustration of a PRP list described in the NVMe standard, according to certain embodiments.

FIG. 5 is a schematic illustration of a PRP list described in the NVMe standard, according to certain embodiments. The command 502 includes a plurality of physical region page (PRP) pointers, such as a first PRP1 504 and a second PRP2 506, where each PRP pointer points to a buffer of a plurality of buffers. The plurality of buffers may be a portion of the HMB, such as the HMB 140 of FIG. 1A. Furthermore, in FIG. 5, each page, page 0 518, page 1 520, page 2 522, and page 3 524 represents a different buffer. In one example, each of the buffers may have a size of aligned to the size of a command or a dummy command, such as about 4 K. A dummy command may be a data storage device generated command to set parameters of the size of the buffers in the HMB. The first PRP1 504 and the second PRP2 506 includes an offset of "xx", where the offset is a pointer offset from a location, such as a header. Each PRP pointer may either be a pointer pointing to a buffer or a pointer pointing to a list of entries.

For example, the first PRP1 504 includes a first pointer 526 that points to the first page 0 518. The second PRP2 506 includes a second pointer 528 that points to the first entry, PRP entry 0 510, of the PRP list 508. The PRP list 508 has an offset of 0, such that the PRP list 508 is aligned with the size of the buffer. For example, a first PRP entry 0 510 includes a third pointer 530 pointing to a second page 1 520, a second PRP entry 1 512 includes a fourth pointer 532 pointing to a third page 2 522, and a third PRP entry 2 514 includes a fifth pointer 534 pointing to a fourth page 3 524. The last entry of the PRP list 508 may include a pointer pointing to a subsequent or a new PRP list.

Figure 6:
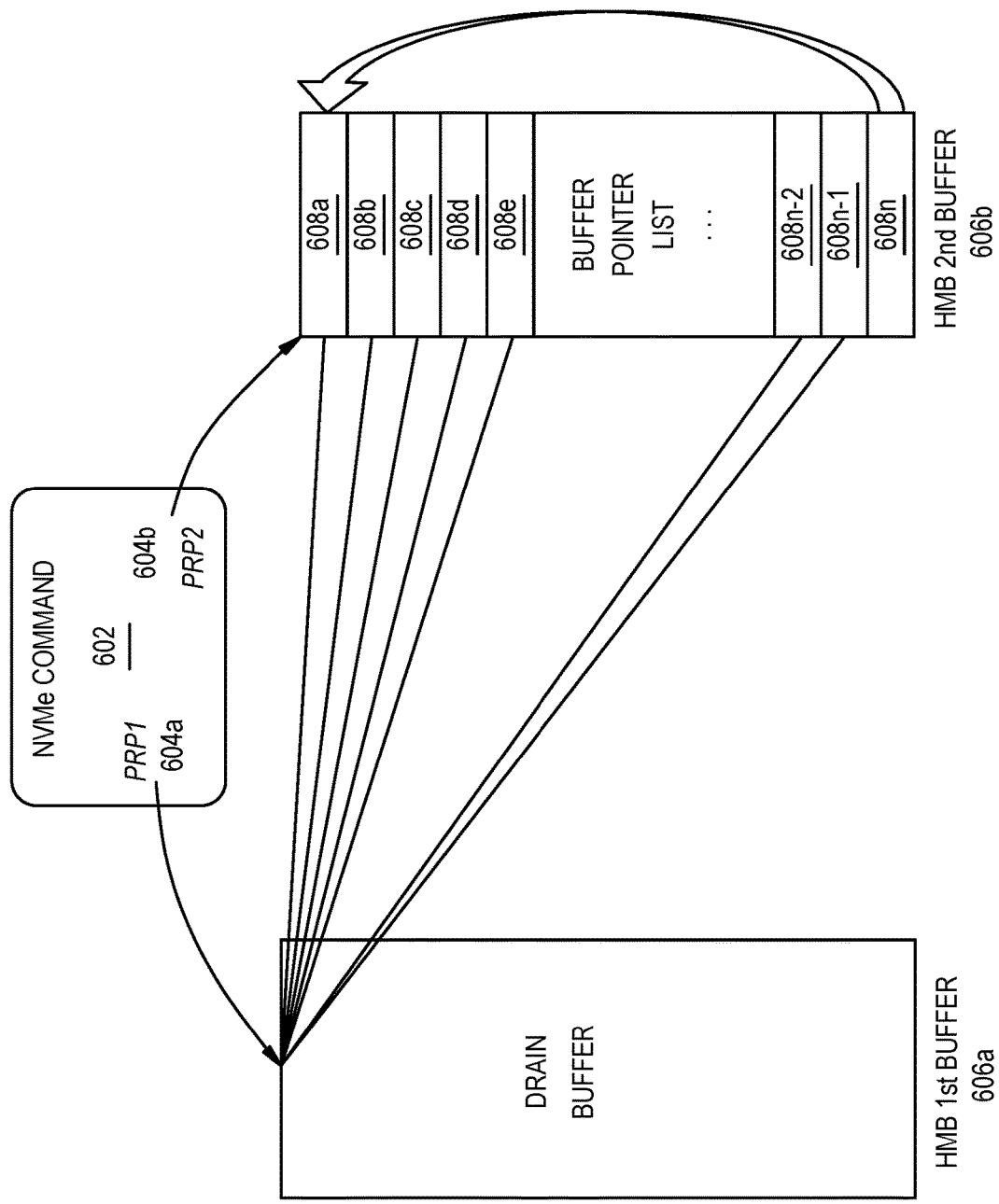
FIG. 6 is a schematic illustration of two host memory buffers (HMBs) used for command draining, according to certain embodiments.

FIG. 6 is a schematic illustration of two host memory buffers (HMBs) used for command draining, according to certain embodiments. The NVMe command 602 is a stored copy of the commands received by the controller, where the NVMe command 602 may be stored in a volatile memory or a non-volatile memory of the data storage device. A first PRP1 604a may be the first PRP 504 and a second PRP2 604b may be the second PRP 506 of FIG. 5. The value of the first PRP1 604a is overwritten to point to a first HMB buffer 606a. The second PRP2 604b points to a second HMB buffer 606b.

The HMB, such as the HMB 140, includes the first HMB buffer 606a and the second HMB buffer 606b. The first HMB buffer 606a and the second HMB buffer 606b may have a size of about 4 KB. The first HMB buffer 606a may be utilized as a drain buffer, where the data associated with the abort command will be drained to or transferred to in both read operations and write operations. The second HMB buffer 606b is a list of a plurality of buffers 608a-608n.

The second HMB buffer 606b may be initialized by the controller, such as the controller 202 of FIG. 2, of the data storage device, such as the data storage device 106 of FIG. 1A, at the initialization phase. The initialization phase may be during the wake up operations of the data storage device, such as when power is supplied to the data storage device. Each pointer of the plurality of buffers 608a-608n of the second HMB buffer 606b points to the first HMB buffer 606a. Furthermore, rather than the last pointer 608n pointing to a subsequent or the next buffer list, the last pointer 608n points to the first buffer 608a of the same HMB buffer. By pointing each pointer of the second HMB buffer 606b to the first HMB buffer 606a, the pointer of the last buffer 608n of the second HMB buffer 606b to the first buffer 608a, and the pointer of the first PRP1 to the first HMB buffer 606a, the relevant data associated with the read operations or the write operations will be drained to the first HMB buffer 606a when an abort command is received.

Figure 7:
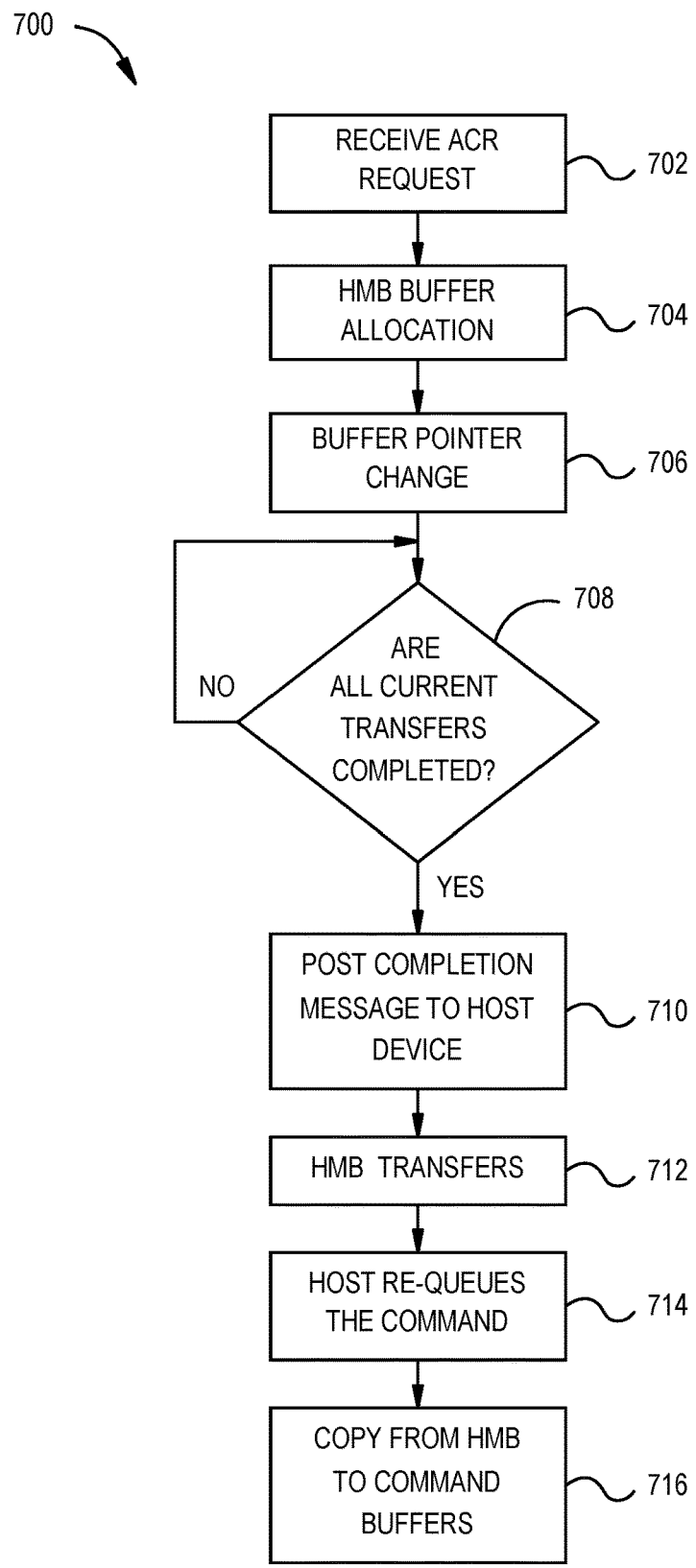
FIG. 7 is a flowchart illustrating advanced command retry (ACR), according to certain embodiments.

FIG. 7 is a flowchart 700 illustrating advanced command retry (ACR), according to certain embodiments. When the data storage device receives a command that includes an ACR request, one or more HMBs may be allocated to hold the set of data of the command. When a failed command has the ACR, the host, such as the host device 104 of FIG. 1A, is notified of the failed command and the host may re-queue the failed command in the command buffer after a delay, such as about 10 seconds. The delay times may be published by the data storage device, such as the data storage device 104 of FIG. 1A, via an identify controller command.

Rather than re-queueing the data associated with the failed command in the host buffer, such as the host DRAM 138 of FIG. 1A, outside of the host HMB, such as the HMB 140 of FIG. 1A, the data associated with the failed command is queued by the data storage device in the HMB. The flowchart 700 is initiated at block 702 when the ACR request for a command is received. At block 704, the HMB buffers are allocated. The HMB buffers includes a first HMB buffer, such as the first HMB buffer 606a of FIG. 6, and a second HMB buffer, such as the second HMB buffer 606b of FIG. 6, where the first HMB buffer is the drain buffer and the second HMB buffer is a list of buffer pointers pointing to the first HMB buffer.

At block 706, the internal versions of the pointers (i.e., PRP1 and PRP2) are modified to point to the allocated HMB buffers. For example, the PRP1 pointer may point to the first HMB buffer and the PRP2 pointer may point to the second HMB buffer. At block 708, the controller determines if all the current transfers for commands that are already started with an associated target host buffer are completed. If the current transfers are not yet completed, then the controller waits for the commands to be completed.

At block 710, after all the current commands are completed, the controller posts a failure completion message to the host with the ACR indication for a command that has failed. At block 712, the one or more HMBs are accessed, such that the data of the failed command is transferred to a location of the one or more HMBs. A representation of the series of transfers is issued on the interface of the host device, where the series of transfers are stored in the one or more HMBs. When the HMB buffers are accessed, the data associated with the failed command is transferred to the first HMB buffer (i.e., the drain HMB buffer). At block 714, the host device re-queues the command to the data storage device, where the re-queued command is the original command that failed. At block 716, the data associated with the re-queued command is copied from the relevant location in the HMB, or in some embodiments, the one or more HMBs, to a host buffer. The re-queued command is executed by the controller utilizing the data stored in the host buffer.

By changing the content of command pointers, abort commands can be processed much more efficiently leading to improved storage device performance. Aborting a command in a simple way while not having any latency compared to the complex, high latency flows that exist today improves efficiency. Additionally, using the HMB as a cache buffer for an ACR failed command speeds up processing.

In one embodiment, a data storage device comprises: one or more memory devices; and a controller coupled to the one or more memory devices, wherein the data storage device is DRAM-less, and wherein the controller is configured to: receive an original command from a host device; begin execution of the original command; receive an abort request command to abort an original command, wherein the abort request command is either received from a host device or generated by the data storage device; modify one or more pointers of the original command that reside in a host memory buffer (HMB); drain a set of data associated with the original command to the HMB; and return a failure completion message to the host device, wherein the failure completion message is returned to the host device after already issued data transfers using original command pointers are completed.

The controller is further configured to continue to process data transfer associated with the original command after receiving the abort request. The processing data transfer continues after completion of the modifying one or more pointers. Draining the set of data occurs: after the failure completion message is returned, begins prior to the failure completion message being returned, or a combination thereof. The failure completion message is delivered while data transfer associated with the original command is still processing, wherein the data transfer occurring after the failure completion message is delivered utilize the modified one or more pointers. Draining the set of data comprises pointing each pointer to a drain buffer. A last pointer points to a same buffer list in which the last pointer resides.

In another embodiment, a data storage device comprises: one or more memory devices; and a controller coupled to the one or more memory devices, wherein the data storage device is DRAM-less, and wherein the controller is configured to: receive an original command from a host device; determine to complete original command with Advanced Command Retry (ACR); allocate one or more host memory buffers (HMBs) for holding a set of data associated with the original command; return a completion message with to the host device, wherein the completion message requests the host device to re-try the original command; execute the original command while transferring data to the allocated one or more buffers within HMBs; receive a reissued original command from the host device; and copy data for the reissued original command from the allocated one or more buffers within HMBs.

When the controller returns the completion message to the host device: a representation of the data is issued on an interface of the host device; and the data is stored in the HMBs, wherein the HMBs are not used for draining data, and wherein the HMBs comprise a plurality of buffers in sufficient size to maintain data to ensure the data storage device can copy data from the HMB to the host device upon receiving a command from the host device to retrieve the data. The controller is further configured to receive a re-issue command of the original command from the host device. The controller is further configured to copy data from the one or more HMBs. The copying comprises copying the series of transfers from the one or more HMBs to a host buffer for the re-issued command. The controller is configured to wait for completing current transfers associated with the original command that have already started prior to returning the completion message, wherein after the controller returns the completion message the data storage device does not access original buffers with original command, and wherein after the controller returns the completion message the data storage device can access the one or more HMBs. During the waiting and prior to returning the completion message, the data storage device may access the original buffers and the one or more HMBs in parallel.

In another embodiment, a data storage device comprises: one or more memory means; and a controller coupled to the one or more memory means, wherein the data storage device is DRAM-less, and wherein the controller is configured to: receive an abort command request from a host device; allocate a first host memory buffer (HMB) and a second HMB for holding a series of data associated with the abort command request, wherein: the first HMB is configured to drain the series of data associated with the abort command request; and the second HMB is configured to point to a drain buffer; and return a completion message to the host device.

The first HMB is the drain buffer. Data associated with the abort command are drained to the drain buffer in read and write operations. The second HMB is configured to contain a buffer pointer list. All but a last pointer in the buffer pointer list points to the drain buffer. The last pointer in the buffer pointer list points to a different pointer in the buffer pointer list.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   one or more memory means; and
   a controller coupled to the one or more memory means, wherein the data storage device is DRAM-less, and wherein the controller is configured to:
   receive an abort command request from a host device;
   allocate a first host memory buffer (HMB) and a second HMB for holding a series of data associated with the abort command request, wherein:
   the first HMB is configured to drain the series of data associated with the abort command request; and
   the second HMB is configured to point to a drain buffer; and
   return a completion message to the host device.

2. The data storage device of claim 1, wherein the first HMB is the drain buffer.

3. The data storage device of claim 1, wherein data associated with the abort command are drained to the drain buffer in read and write operations.

4. The data storage device of claim 1, wherein the second HMB is configured to contain a buffer pointer list.

5. The data storage device of claim 4, wherein all but a last pointer in the buffer pointer list points to the drain buffer.

6. The data storage device of claim 5, wherein the last pointer in the buffer pointer list points to a different pointer in the buffer pointer list.

7. The data storage device of claim 1, wherein a failure completion message is delivered while data transfer associated with the original command is still processing, wherein the data transfer occurring after a failure completion message is delivered utilize modified one or more pointers.

8. The data storage device of claim 1, wherein the controller is further configured to drain a set of data, wherein the draining the set of data comprises pointing each pointer to a drain buffer.

9. The data storage device of claim 8, wherein a last pointer points to a same buffer list in which the last pointer resides.

10. The data storage device of claim 1, wherein the controller is further configured to:
    receive an original command from the host device;
    determine to complete the original command with Advanced Command Retry (ACR);
    allocate one or more buffers for holding a set of data associated with the original command;

return a completion message with an ACR indication to the host device, wherein the completion message requests the host device to re-try the original command;

execute the original command while transferring data to the allocated one or more buffers;

receive a reissued original command from the host device; and copy data for the reissued original command from the allocated one or more buffers.

* * * * *